United States Patent [19]

Maeda et al.

[11] 4,431,775

[45] Feb. 14, 1984

[54] PROCESS FOR VULCANIZING RUBBER AT A LOW TEMPERATURE

[75] Inventors: Isamu Maeda; Masashi Aoshima, both of Ichihara, Japan

[73] Assignee: Sumitomo Chemical Company, Limited, Osaka, Japan

[21] Appl. No.: 304,959

[22] Filed: Sep. 23, 1981

Related U.S. Application Data

[60] Division of Ser. No. 188,613, Sep. 19, 1980, Pat. No. 4,310,443, which is a division of Ser. No. 33,696, Apr. 26, 1979, Pat. No. 4,248,987, which is a division of Ser. No. 814,918, Jul. 12, 1977, Pat. No. 4,166,892, which is a continuation of Ser. No. 655,547, Feb. 5, 1976, abandoned, which is a continuation of Ser. No. 429,588, Jan. 2, 1974, abandoned.

[30] Foreign Application Priority Data

Jan. 12, 1973 [JP] Japan .................................. 48-6805

[51] Int. Cl.$^3$ ...................... C08L 15/02; C08L 23/28; C08L 23/36; C08J 3/24
[52] U.S. Cl. .................................. 525/193; 525/192; 525/194; 525/215; 525/240; 525/292; 525/305; 525/331.1; 525/331.7; 525/334.1; 525/332.5; 525/377
[58] Field of Search ............... 525/194, 193, 214, 292, 525/326.3, 331.4, 377, 331.3, 240, 305, 334.1, 331.7

[56] References Cited

U.S. PATENT DOCUMENTS

| | | | |
|---|---|---|---|
| 2,833,752 | 5/1958 | Honn et al. | 525/326.3 |
| 2,958,672 | 11/1960 | Goldberg et al. | 526/57 |
| 3,654,216 | 4/1972 | Murray | 526/48.3 |
| 3,755,232 | 8/1973 | Rodaway et al. | 526/57 |

*Primary Examiner*—Carman J. Seccuro
*Attorney, Agent, or Firm*—Stevens, Davis, Miller & Mosher

[57] ABSTRACT

A process for vulcanizing a rubber base comprising at least one halogen-containing amorphous polymer at a low temperature ranging from 5° to 85° C., which comprises carrying out the vulcanization in the presence of 0.01 to 20 parts by weight of an organic hydroperoxide and/or ketone peroxide per 100 parts by weight of the rubber base.

In the above process, at least one member selected from the group consisting of (I) the oxides of metals, such as zinc, lead, chromium, cobalt, nickel, magnesium, manganese, copper and iron, or the metallic salts of said metals with aliphatic or cycloaliphatic carboxylic acid having 8 to 24 carbon atoms; (II) methacrylic esters; (III) maleimides; and (IV) oximes, may be used as a vulcanization activator or a vulcanization accelerator in an amount of 0.01 to 20 parts by weight per 100 parts by weight of the rubber base.

13 Claims, No Drawings

PROCESS FOR VULCANIZING RUBBER AT A LOW TEMPERATURE

This is a division of copending application Ser. No. 188,613 filed Sept. 19, 1980, now U.S. Pat. No. 4,310,443 which in turn is a division of application Ser. No. 33,696 filed Apr. 26, 1979, now U.S. Pat. No. 4,248,987, which in turn is a division of application Ser. No. 814,918 filed July 12, 1977, now U.S. Pat. No. 4,166,892, which in turn is a continuation of Ser. No. 655,547 filed Feb. 5, 1976, now abandoned, which in turn is a continuation of Ser. No. 429,588 filed Jan. 2, 1974, now abandoned.

The present invention relates to a process for vulcanizing at least one halogen-containing amorphous polymer at a low temperature. More particularly, it pertains to a process for vulcanizing at least one halogen-containing amorphous polymer at a low temperature, in which an organic hydroperoxide and/or ketone peroxide as a vulcanizing agent is used alone or in combination with a specific vulcanization activator or accelerator to achieve the vulcanization at a temperature as low as from 5° to 85° C.

As the known literature references concerning a low temperature vulcanization process using an organic hydroperoxide as a vulcanizing agent, there are Japanese Patent Publication Nos. 19,930/67 and 16,584/70. These relate to amorphous copolymers consisting of ethylene, alpha-olefin and cyclic or acyclic polyene having non-conjugated double bond. There is found no literature concerning the halogen-containing amorphous polymers which are the object of the present invention.

At present, halogen-containing amorphous polymers are, in many cases, used in adhesives, paints and sealants. It is greatly significant that a low temperature vulcanization be applicable to these uses. In order to attain this object, therefore, the present inventors have long done extensive research on the low temperature vulcanization of halogen-containing amorphous polymers to achieve this invention. This invention is characterized by using an organic hydroperoxide or ketone peroxide as a vulcanizing agent.

An object of the present invention is to provide a process for vulcanizing halogen-containing amorphous polymers at a low temperature.

Another object of the present invention is to provide a process for vulcanizing at a low temperature halogen-containing amorphous polymers, which process is applicable to adhesives, paints and sealants.

A further object of the present invention is to provide a process for vulcanizing halogen-containing amorphous polymers at a low temperature, in which an organic hydroperoxide or ketone peroxide is used as a vulcanizing agent.

A still further object of the present invention is to provide a process for vulcanizing halogen-containing amorphous polymers at a low temperature, in which an organic hydroperoxide or ketone peroxide as a vulcanizing agent is used together with a vulcanization activator or a vulcanization accelerator.

The other objects and advantages of the present invention will become clear from the following description.

According to the present invention, there is provided a process for vulcanizing a rubber base comprising at least one amorphous polymer at a low temperature ranging from 5° to 85° C., which comprises carrying out the vulcanization in the presence of 0.01 to 20 parts by weight of an organic hydroperoxide and/or ketone peroxide per 100 parts by weight of the rubber base, and, if necessary, in the presence of 0.01 to 20 parts by weight of at least one vulcanization activator or accelerator selected from the group consisting of (I) metal oxides or metallic salts of aliphatic or cycloaliphatic carboxylic acids having 8 to 24 carbon atoms, (II) methacrylates, (III) maleimides and (IV) oximes, per 100 parts by weight of the rubber base.

The halogen-containing amorphous polymers in the present invention include, for example, chloroprene rubber, chlorinated polyethylene, chlorosulfonated polyethylene and chlorinated ethylene-propylene-diene rubber, and the halogens include chlorine and bromine. Chlorine is the most popular and important.

The rubber base in the present invention includes halogen-containing amorphous polymers alone, mixtures thereof and mixtures of halogen-containing amorphous polymer and halogen-free amorphous polymers. More particularly, it includes not only a mixture obtained by mixing the halogen-containing amorphous polymer with the halogen-free amorphous polymer for the purpose of enhancing the weather resistance and heat resistance and reducing the cost of the halogen-containing amorphous polymer but also a mixture obtained by mixing the halogen-free amorphous polymers with the halogen-containing amorphous polymer for the purpose of enhancing the tackiness and adhesiveness of the halogen-free amorphous polymer or imparting flame-proof property to the halogen-free amorphous polymer. In other words, it is indispensable for the rubber base described herein to comprise at least one halogen-containing amorphous polymer. The halogen-free amorphous polymers include, for example, styrene-butadiene rubber, ethylene-propylenediene rubber and natural rubber. Further, the halogen-free amorphous polymers used for the present invention include low molecular weight amorphous copolymers such as low molecular weight ethylene-propylene rubber, too.

The organic hydroperoxides and ketone peroxides used in the present invention include, for example, alpha-cumyl hydroperoxide, tertiary butyl hydroperoxide, p-menthane hydroperoxide, m,p-diisopropylbenzene-monohydroperoxide, methyl ethyl ketone peroxide, methyl isobutyl ketone peroxide, acetylacetone peroxide, and the like.

Another great feature of the present invention is that at least one compound belonging to the following groups may be used as a vulcanization activator or a vulcanization accelerator to adjust the vulcanization velocity:

(I) The oxides of metals such as zinc, lead, chromium, cobalt, nickel, magnesium, manganese, copper and iron; and the metallic salts of these metals with aliphatic or cycloaliphatic carboxylic acids having 8 to 24 carbon atoms.

The aliphatic or cycloaliphatic carboxylic acid having 8 to 24 carbon atoms mentioned in group (I) include, for example, n-octoic acid, naphthenic acid, abietic acid, lignoceric acid and 2-ethylhexanoic acid.

(II) Methacrylic esters such as ethylene dimethacrylate, 1,3-butylene dimethacrylate, triethylolpropane trimethacrylate, and the like.

(III) Maleimides such as N,N'-m-phenylene bismaleimide, phenyl maleimide, and the like.

(IV) Oximes such as p-quinone dioxime, p,p'-dibenzoyl quinone dioxime, and the like.

In the present invention the vulcanizing agent is used in an amount of 0.01 to 20 parts by weight, preferably 0.5 to 15 parts by weight per 100 parts by weight of the rubber base. The vulcanization activator or the vulcanization accelerator is used in an amount of 0.01 to 20 parts by weight, preferably 0.1 to 10 parts by weight per 100 parts by weight of the rubber base. The respective quantities of the vulcanizing agent and the vulcanization activator or the vulcanization accelerator are decided depending upon the application and the object. In general, the vulcanization velocity is somewhat accelerated with an increase in amount of these compounding agents. Further, when the vulcanizing agent and the vulcanization activator or accelerator are liquid, they can be applied as they are, or when they are solid, in the form of solutions in proper organic solvents, to the surface of an objective to be vulcanized by spraying or brushing. Accordingly, it is not always necessary to use them in admixture with the rubber base, fillers or other compounding agents.

The rubber base usable for the present invention may contain various fillers such as carbon black, talc, calcium carbonate, etc.; various higher fatty acids; coloring agents; anti-oxidants; ultraviolet absorbers; and softening agents including mineral oils.

By using the process of the present invention, there can be provided various rubber products, sheets, roofings, sealants, adhesives, paints, and the like.

Referring to Examples, the present invention is further illustrated, but should not be interpreted to be limited thereto.

EXAMPLE 1

Using chloroprene rubber as the halogen-containing amorphous polymer, examination was made on the representative vulcanization system with or without vulcanization activator or accelerator. The result thereof is shown below.

Composition

| | | |
|---|---|---|
| Chloroprene rubber (Raw rubber Mooney viscosity, $ML_{1+4}$ = 47(100° C.); density = 1.23) | 100 | parts by weight |
| SRF carbon black | 50 | parts by weight |
| Zinc oxide | 5 | parts by weight |
| Stearic acid | 1 | parts by weight |
| Naphthenic oil | 10 | parts by weight |
| Alpha-cumyl hydroperoxide (Concentration: 70% by weight) | 7 | parts by weight |
| Vulcanization accelerator | 2 | parts by weight |

Test Method

The above-mentioned materials were blended in a mixing roll and formed into a sheet with a thickness of 1 mm, which was then allowed to stand at 40° C. After a given time, the sheet was subjected to measurement of tensile strength and elongation according to JIS K-6301 (JIS is an abbreviation of Japan Industrial Standards) to examine the vulcanization state. The result obtained is as shown in Table 1.

TABLE 1

| | Vulcanization accelerator | | | | | |
|---|---|---|---|---|---|---|
| | — | | p-Quinone dioxime | | Ethylene dimethacrylate | |
| | Characteristics | | | | | |
| Vulcanization time (day) | $T_B$ (kg/cm²) | $E_B$ (%) | $T_B$ (kg/cm²) | $E_B$ (%) | $T_B$ (kg/cm²) | $E_B$ (%) |
| 1 | 27 | 930 | 18 | 1120 | 50 | 730 |
| 3 | 37 | 700 | 46 | 910 | 68 | 450 |
| 6 | 36 | 710 | 71 | 710 | 77 | 330 |

Note:
$T_B$: Tensile strength at break
$E_B$: Elongation at break

EXAMPLE 2

Examination was made on a chlorinated ethylene-propylene-diene rubber as the halogen-containing amorphous polymer. The result thereof is shown below.

Composition

| | | |
|---|---|---|
| Chlorinated ethylene-propylene-diene rubber | 100 | parts by weight |
| HAF carbon black | 50 | parts by weight |
| Zinc oxide | 5 | parts by weight |
| Stearic acid | 1 | parts by weight |
| Naphthenic oil | 10 | parts by weight |
| Alpha-cumyl hydroperoxide (Concentration: 70% by weight) | 7 | parts by weight |
| Vulcanization accelerator | 2 | parts by weight |

The above chlorinated ethylene-propylene-diene rubber was obtained by chlorinating an ethylene-propylene-5-ethylidene-2-norbornene rubber having a raw rubber Mooney viscosity of $ML_{1+4}=40$ (100° C.), an iodine value of 12 and a propylene content of 50% by weight, to a chlorine content of 25% by weight.

Test method

The same test method as in Example 1 was repeated. The result obtained is shown in Table 2.

TABLE 2

| | | — | | p-Quinone dioxime | |
|---|---|---|---|---|---|
| Vulcanization accelerator Characteristics | | $T_B$ (Kg/cm²) | $E_B$ (%) | $T_B$ (Kg/cm²) | $E_B$ (%) |
| Vulcanization time (day) | 1 | 12 | 570 | 12 | 570 |
| | 5 | 18 | 820 | 24 | 640 |
| | 10 | 30 | 870 | 45 | 650 |
| | 20 | 65 | 730 | 135 | 470 |
| | 30 | 103 | 570 | 165 | 430 |

EXAMPLE 3

Using chloroprene rubber, examination was made on metal oxides and metal salts of higher fatty acids as the vulcanization accelerator or activator. The result obtained is shown below.

Composition

The same as in Example 1, except that the amounts of vulcanization accelerator added are as shown in Table 3.

Test method

The same as in Example 1. The result obtained is shown in Table 3.

TABLE 3

| Vulcanization accelerator Amount (phr) | | — | Cobalt* naphthenate 1 | Iron* naphthenate 1 | Chromium* naphthenate 1 | Cobalt* abietate 1 | Magnesium oxide 10 | Lead monoxide 10 | Cobalt*(*) abietate 10 | Magnesium(*) oxide 10 |
|---|---|---|---|---|---|---|---|---|---|---|
| Characteristics | Vulcanization time (day) | | | | | | | | | |
| $T_B$ (kg/cm$^2$) | 1 | 27 | 105 | 57 | 44 | 82 | 44 | 32 | 9 | 15 |
| | 3 | 37 | 118 | 72 | 46 | 103 | 81 | 47 | 7 | 21 |
| | 5 | 36 | 100 | 72 | 50 | 101 | 91 | 46 | 8 | 19 |
| | 12 | 38 | 102 | 76 | 54 | 110 | 98 | 61 | 11 | 20 |
| $E_B$ (%) | 1 | 930 | 590 | 860 | 880 | 780 | 780 | 850 | 1110 | 690 |
| | 3 | 700 | 420 | 630 | 630 | 560 | 580 | 610 | 1150 | 690 |
| | 5 | 700 | 380 | 590 | 600 | 500 | 490 | 580 | 1000 | 620 |
| | 12 | 550 | 340 | 390 | 490 | 400 | 420 | 490 | 1150 | 680 |

*Metal content: 5% by weight
(*)Referential Example: alpha-cumyl hydroperoxide was not mixed.

Example 3 fully proves the necessity of alphacumyl hydroperoxide as the vulcanizing agent and the effect of the oxides of these metals or the salts of these metals with higher fatty acids as the vulcanization accelerator or activator.

EXAMPLE 4

Examination was made on the effect of a vulcanization accelerator upon chloroprene at 40° C. and 70° C. The result thereof is shown below.

Test method

The same as in Example 1. The result obtained is shown in Table 4.

Composition

| | |
|---|---|
| Chlorinated-ethylene-propylene-diene rubber | 100 parts by weight |
| Carbon black | 50 parts by weight |
| Naphthenic oil | 5 parts by weight |
| Zinc oxide | 5 parts by weight |
| Stearic acid | 1 parts by weight |
| Alpha-cumyl hydroperoxide | 7 parts by weight |
| p-Quinone dioxime | 2 parts by weight |

Test method

TABLE 4

| Vulcanization accelerator | | — | | p-Quinone dioxime | | Ethylene dimethacrylate | | N,N'—m-phenylene bismaleimide | | Cobalt abietate | |
|---|---|---|---|---|---|---|---|---|---|---|---|
| Composition (part by weight) | Chloroprene rubber (Raw Rubber Mooney viscosity, ML$_{1+4}$ = 47 (100° C.); Density = 1.23) | 100 | | 100 | | 100 | | 100 | | 100 | |
| | SRF carbon black | 50 | | 50 | | 50 | | 50 | | 50 | |
| | Naphthenic oil | 10 | | 10 | | 10 | | 10 | | 10 | |
| | Zinc oxide | 5 | | 5 | | 5 | | 5 | | 5 | |
| | Stearic acid | 1 | | 1 | | 1 | | 1 | | 1 | |
| | Alpha-cumyl hydroperoxide | 7 | | 7 | | 7 | | 7 | | 7 | |
| | Vulcanization accelerator | 0 | | 2 | | 2 | | 2 | | 1 | |
| | Vulcanization temperature (°C.) | 40 | 70 | 40 | 70 | 40 | 70 | 40 | 70 | 40 | 70 |
| $T_B$ (kg/cm$^2$) | Vulcanization time (day) 1 | 38 | 105 | 50 | 111 | 66 | 102 | 76 | 118 | 77 | 123 |
| | 3 | 53 | 114 | 59 | 134 | 58 | 110 | 94 | 130 | 106 | 128 |
| | 6 | 55 | 102 | 56 | 141 | 55 | 108 | 98 | 144 | 102 | 119 |
| | 9 | 56 | 106 | 61 | 136 | 61 | — | 87 | 128 | 110 | — |
| | 15 | 58 | — | 69 | — | 65 | — | 94 | — | 108 | — |
| $E_B$ (%) | Vulcanization time (day) 1 | 880 | 380 | 870 | 320 | 520 | 270 | 560 | 160 | 600 | 300 |
| | 3 | 740 | 280 | 880 | 280 | 470 | 310 | 390 | 160 | 450 | 310 |
| | 6 | 650 | 230 | 850 | 240 | 440 | 210 | 230 | 140 | 430 | 250 |
| | 9 | 680 | 220 | 810 | 240 | 400 | — | 290 | 130 | 360 | — |
| | 15 | 600 | — | 710 | — | 380 | — | 240 | — | 350 | — |

EXAMPLE 5

Examination was made on the effect of carbon black upon the low temperature vulcanization of the same chlorinated ethylene-propylene-diene rubber as in Example 2. The result thereof is given below.

The same as in Example 1. The result obtained is shown in Table 5.

TABLE 5

| Kind of carbon black | | | ISAF | HAF | FEF | GPF |
|---|---|---|---|---|---|---|
| $T_B$ (kg/cm$^2$) | Vulcanization | 1 | 13 | 9 | 11 | 8 |
| | | 6 | 15 | 14 | 13 | 11 |

TABLE 5-continued

| Kind of carbon black | | | ISAF | HAF | FEF | GPF |
|---|---|---|---|---|---|---|
| | time | 20 | 123 | 111 | 102 | 68 |
| | (day) | 30 | 202 | 149 | 133 | 105 |
| $E_B$ | Vulcani- | 1 | 370 | 350 | 390 | 450 |
| (%) | zation | 6 | 620 | 650 | 790 | 760 |
| | time | 20 | 480 | 470 | 520 | 590 |
| | (day) | 30 | 330 | 350 | 400 | 450 |

EXAMPLE 6

Examination was made on mixtures of a halogen-containing amorphous polymer and the halogen-free amorphous copolymer as the rubber base, in which chloroprene rubber was used as the halogen-containing amorphous polymer and the same ethylene-propylene-diene rubber as in Example 2 was used as the halogen-free amorphous copolymer.

Test Method

The same as in Example 1. The result obtained is shown in Table 6.

TABLE 6

| Composition (part by weight) | Chloroprene rubber (Raw rubber Mooney viscosity, $ML_{1+4} = 47$ (100° C.); density = 1.23) | | 100 | 75 | 50 | 25 | —* |
|---|---|---|---|---|---|---|---|
| | Ethylene-propylene-diene rubber | | — | 25 | 50 | 75 | 100 |
| | SRF carbon black | | 50 | 50 | 50 | 50 | 50 |
| | Naphthenic oil | | 10 | 10 | 10 | 10 | 10 |
| | Zinc oxide | | 5 | 5 | 5 | 5 | 5 |
| | Stearic acid | | 1 | 1 | 1 | 1 | 1 |
| | Alpha-cumyl hydroperoxide | | 7 | 7 | 7 | 7 | 7 |
| | Cobalt abietate | | 0.5 | 0.5 | 0.5 | 0.5 | 0.5 |
| | p-Quinone dioxime | | 2 | 2 | 2 | 2 | 2 |
| $T_B$ | Vulcanization | 1 | 60 | 47 | 41 | 54 | 87 |
| (kg/cm²) | time (day) | 3 | 73 | 64 | 68 | 69 | 101 |
| | | 10 | 87 | 88 | 93 | 80 | 102 |
| $E_B$ | Vulcanization | 1 | 780 | 660 | 510 | 420 | 340 |
| (%) | time (day) | 3 | 530 | 490 | 490 | 420 | 350 |
| | | 10 | 400 | 420 | 420 | 340 | 300 |

*Referential example

EXAMPLE 7

Examination was made on the effect of vulcanizing agent upon the low temperature vulcanization of chloroprene rubber as the halogen-containing amorphous polymer.

Composition

| | | |
|---|---|---|
| Chloroprene rubber (Raw rubber Mooney viscosity, $ML_{1+4} = 47$ (100°); density = 1.23) | 100 | parts by weight |
| SRF carbon black | 50 | parts by weight |
| Naphthenic oil | 10 | parts by weight |
| Zinc oxide | 5 | parts by weight |
| Stearic acid | 1 | parts by weight |
| Cobalt abietate | 0.5 | parts by weight |
| Vulcanizing agent | | 1/30 mole. |

Test method

The same test method as in Example 1 was repeated, except that vulcanization was carried out at room temperature.

The result obtained is shown in Table 7.

TABLE 7

| | Kind of vulcanizing agent | | Tertiary-butyl hydroperoxide | m,p-Diisopropyl benzene mono-hydroperoxide | p-Menthane hydroperoxide | Methyl ethyl ketone peroxide |
|---|---|---|---|---|---|---|
| $T_B$ | Vulcaniza- | 1 | 35 | 69 | 61 | 26 |
| (kg/cm²) | tion time | 3 | 45 | 93 | 82 | 35 |
| | (day) | 5 | 53 | 89 | 85 | 45 |
| | | 7 | 72 | 101 | 89 | 48 |
| | | 10 | 69 | 105 | 94 | 58 |
| $E_B$ | Vulcani- | 1 | 830 | 750 | 780 | 810 |
| (%) | zation time | 3 | 790 | 700 | 750 | 790 |
| | (day) | 5 | 690 | 690 | 740 | 770 |
| | | 7 | 610 | 600 | 700 | 730 |
| | | 10 | 610 | 500 | 690 | 690 |

What is claimed is:

1. A process for vulcanizing a non-aqueous rubber base comprising at least one halogen-containing amorphous polymer other than chloroprene rubber, said process comprising
   vulcanizing said non-aqueous rubber base at a temperature ranging from 5° to 85° C. in the presence of
   0.01 to 20 parts by weight of at least one vulcanizing agent selected from the group consisting of an organic hydroperoxide and ketone peroxide per 100 parts by weight of said rubber, and
   0.01 to 20 parts by weight of at least one vulcanization activator or accelerator selected from the group consisting of ethylene dimethacrylate, 1,3-butylene dimethacrylate, triethylolpropane trimethacrylate, p-quinone dioxime, and p,p'-dibenzoyl quinone dioxime.

2. The process of claim 1 wherein said vulcanization activator or accelerator is ethylene dimethyacrylate.

3. The process of claim 1 wherein said vulcanization activator or accelerator is 1,3-butylene dimethyacrylate.

4. The process of claim 1 wherein said vulcanization activator or accelerator is triethylolpropane trimethacrylate.

5. The process of claim 1 wherein said vulcanization activator or accelerator is p-quinone dioxime.

6. The process of claim 1 wherein said vulcanization activator or accelerator is p,p'-dibenzoyl quinone dioxime.

7. The process of claim 1 wherein said vulcanizing agent is present in an amount of 0.5 to 15 parts by weight.

8. The process of claim 1 wherein said vulcanizing agent is selected from the group consisting of alpha-cumyl hydroperoxide, teriary-butyl hydroperoxide, p-menthane hydroperoxide, m,p-diisopropylbenzene monohydroperoxide, methyl ethyl ketone peroxide, methyl isobutyl ketone peroxide, and acetylacetone peroxide.

9. The process of claim 1 wherein said vulcanizing agent is alpha-cumyl hydroperoxide.

10. The process of claim 1 wherein said halogen-containing amorphous polymer is a member selected from the group consisting of chlorinated polyethylene, chlorosulfonated polyethylene, and chlorinated ethylene-propylene-diene rubbers.

11. The process of claim 1 wherein said halogen-containing amorphous polymer contains a halogen-free amorphous polymer.

12. The process of claim 11 wherein said halogen-free amorphous polymer is a member selected from the group consisting of styrene-butadiene rubber, ethylene-propylene-diene rubbers, natural rubber, and low molecular weight ethylene-propylene rubber.

13. Vulcanized halogen-containing amorphous polymer produced by the process of claim 1.

* * * * *